United States Patent [19]

Soes et al.

[11] 4,435,038
[45] Mar. 6, 1984

[54] CONNECTOR FOR USE IN BUTT SPLICING TWO OPTICAL FIBRES

[75] Inventors: Lucas Soes, Rosmalen; Eduardus F. A. Ten Berge, Drunen, both of Netherlands

[73] Assignee: AMP Incorporated, Harrisburg, Pa.

[21] Appl. No.: 339,209

[22] Filed: Jan. 13, 1982

[30] Foreign Application Priority Data

Jan. 14, 1981 [GB] United Kingdom ................ 8101105

[51] Int. Cl.³ ............................................... G02B 7/26
[52] U.S. Cl. .................................................. 350/96.21
[58] Field of Search ................ 350/96.20, 96.21, 96.22

[56] References Cited

U.S. PATENT DOCUMENTS

| 4,029,390 | 6/1977 | Chinnock et al. | 350/96.21 |
| 4,339,172 | 7/1982 | Leather | 350/96.21 |
| 4,353,620 | 10/1982 | Schultz | 350/96.21 |

FOREIGN PATENT DOCUMENTS 1556476 11/1979 United Kingdom ............. 350/96.21
2045454 10/1980 United Kingdom .

OTHER PUBLICATIONS

"Fiber Connectoring/Splicing Techniques Promise to Solve Cost, Handling Problems"—8-20-80—EDN Magazine.

*Primary Examiner*—John D. Lee
*Attorney, Agent, or Firm*—Adrian J. LaRue

[57] ABSTRACT

A connector for use in butt splicing two optical fibres (100) comprises a right-circular cylindrical tubular member (4) of deformable material and a support body (1) formed by three integrally formed elongate members (2) of deformable material joined by two webs (3), the support body (1) being a circular overall cross-section to be received in the tubular member (4) and a central passage (6) to receive end portions of two fibres (100) to be spliced, there being radial spaces (7) between the three members (2) of the support body (1) whereby on crimping of the connector to form the splice little or no axial movement of the fibre ends relative to each other takes place.

4 Claims, 6 Drawing Figures

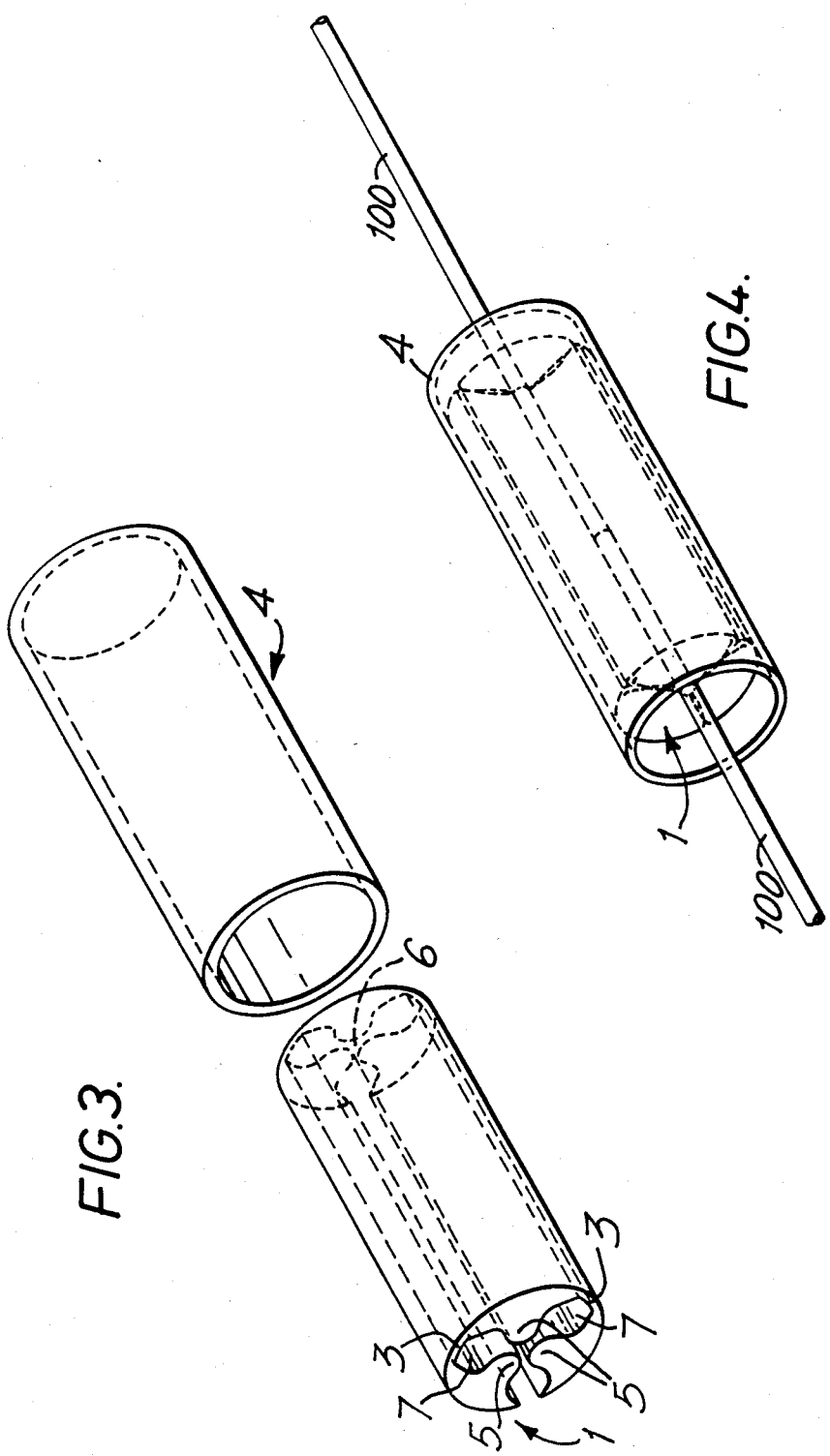

CONNECTOR FOR USE IN BUTT SPLICING TWO OPTICAL FIBRES

This invention relates to a connector for use in butt splicing two optical fibres.

Optical fibres are rapidly becoming of importance in data transmission systems such as telephone systems, and there is thus a need for a connector by which two optical fibres can be butt spliced together with the connection introducing the minimum possible losses into the transmission path formed by the fibres. In particular there is a need for such a connector which is quick and easy to use, and which can be readily applied in the field by a workman using simple tooling.

The basic difficulty to be overcome when butt splicing two optical fibres is to ensure that the adjacent end faces of the fibres are accurately axially aligned while also ensuring that the required spacing between the end faces is maintained. The end faces must not touch since this could damage them, nor must they be separated by more than a certain distance, since a greater separation would introduce unacceptable losses into the transmission path through the splice.

In British Patent Specification No. 1,549,928 there is disclosed a connector for use in butt splicing two optical fibres, comprising a tubular member of deformable material, and three elongate members receivable in the tubular member to define a central passage to receive end portions of the two optical fibres to be spliced.

For use of this known connector the three elongate members which are each of circular cross-section, are positioned within the tubular member which is triangular in cross-section, such that the three elongate members define between them the central axially extending passage into which end portions of the two fibres to be spliced are then inserted. Each fibre is supported at three peripherally spaced positions provided by the three elongate members respectively such that the two fibres are axially aligned. The tubular member is then radially crimped such that the three elongate members are compressed into intimate engagement with the two fibres thereby to form the required splice connection with the two fibres accurately axially aligned.

A difficulty which arises with this known connector is that due to the circular cross-section of the elongate members, and the triangular cross-section of the tubular member, on crimping the compression of the elongate members causes axial deformation thereof, which deformation can result in the end faces of the two optical fibres being brought into damaging engagement or being unduly separated thereby introducing unacceptable losses into the transmission path through the splice.

Further, the known connector comprises at least four separate parts, namely the tubular member and the three elongate members, which must be separately produced and then assembled.

According to this invention, in a known connector as discussed above the tubular member is a right-circular cylindrical member, and the three elongate members are of similar transverse cross-section and are integrally formed in side-by-side relationship joined by two webs, the transverse cross-section of each elongate member being such that the three elongate members can be folded together by bending of the webs, to define a substantially circular overall cross-section support body receivable in the tubular member, the innermost parts of the three elongate members together defining the central passage, and such that there are radial spaces between the three elongate members throughout the length of the support body.

Preferably the tubular member is of metal, while the support member can be of metal or of plastics material.

The support member can be manufactured by extrusion.

The connector of this invention has the advantages that it is relatively cheap and easy to manufacture, and, more importantly is easy to use since it consists of only two parts. After bringing together of the three integrally formed members of the support body, and positioning of the support body in the tubular member, end portions of two optical fibres to be spliced are inserted into the central passage defined in the support body, and the tubular member is then radially crimped and axially restrained, using a conventional type of crimping tool, to compress the support body to grip the fibres and thus hold them in axial alignment. The three points of support for each fibre provided by the three members of the support body respectively ensure axial alignment of the fibres, while the radial spaces between the support body members are closed up during the crimping operation such that the support body is deformed substantially only radially, with any slight axial deformation of the support body that takes place being insufficient to cause the end faces of the fibres to engage or be moved apart by an excessive distance.

A further advantage of the connector of this invention is that it can be of small size relative to the known connector discussed above, since only those parts of the three elongate members of the support body, which contact the optical fibres need have a radius similar to that of the three circular cross-section elongate members of the known connector. The three elongate members of the support body of the connector of this invention can be given a cross-section such that together they define a circular cross-section support body of relatively small diameter, that is with a diameter smaller than the maximum dimension defined by the three circular cross-section elongate members of the known connector.

A connector according to this invention will now be described by way of example with reference to the drawings in which:

FIG. 3 is a perspective view of the support member of FIGS. 1 and 2 in its folded condition, and the tubular member of the connector in which the folded support member is to be received;

FIG. 4 is a perspective view showing the connector in its assembled state and with two optical fibres received therein;

Figure 1:
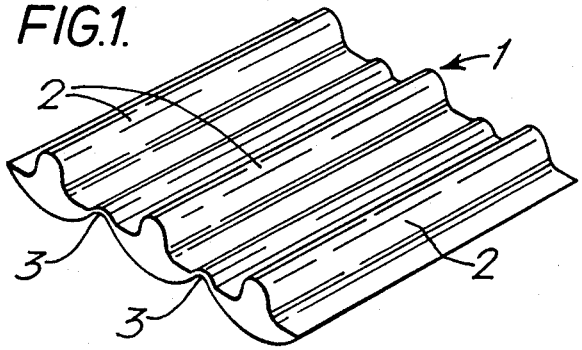
FIG. 1 is a perspective view of the support member of the connector in its condition as manufactured.
Figure 2:
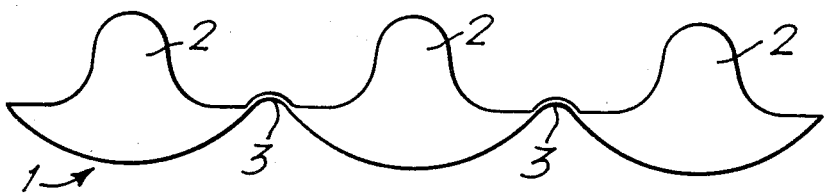
FIG. 2 is an end view of the support member of FIG. 1.

The support body 1 of the connector is an extruded member of deformable metal or plastics material, and comprises three, elongate, similar transverse cross-section (see FIG. 2) members 2 integrally formed in side-by-side relationship joined by two webs 3. Each member 2 has a transverse cross-section, as shown in FIG. 2, which is such that the three members 2 can be folded together by bending of the webs 3, to define a substantially circular overall transverse cross-section support body 1, as best seen in FIG. 3.

Figure 5:
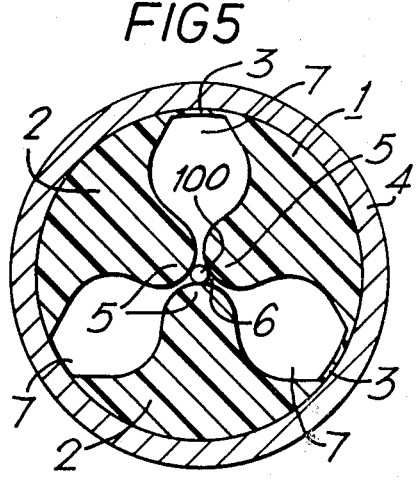
FIG. 5 is a cross-sectional view of the assembly of FIG. 4 prior to crimping to form the connection.

The tubular member 4 of the connector is a right-circular cylindrical tubular member of deformable metal, and of a size such that the support body 1 in its folded condition as shown in FIG. 3, can be received in the tubular member 4, as shown in FIGS. 4 and 5.

When the support body 1 is in its folded condition, the inner-most parts 5 of its three members 2 together define a central passage 6 to receive and support in axial alignment end portions of two optical fibres 100 to be spliced. Each fibre 100 is supported at three spaced positions around its periphery provided by the three members 2 respectively, and since the two fibres are supported by the same three members 2 of the support body 1, axial alignment of the fibres 100 is ensured.

When the support body 1 is in its initial folded condition there are three radial spaces 7 between the members 2 throughout the length of the support body 1, as best shown in FIG. 3.

For use of the connector, the support body 1 is folded to the condition shown in FIG. 3, and is then inserted into the tubular member 4. End portions of the two fibres 100 are then inserted into the passage 6 defined by the members 2 of the support body 1, the assembly then being as shown in FIG. 5.

The tubular member 4 is then radially crimped and axially restrained to reduce its diameter, using a conventional crimping tool, this compressing the support body 1 to grip the fibres 100, a permanent splice connection thus being formed between the fibres 100.

Figure 6:
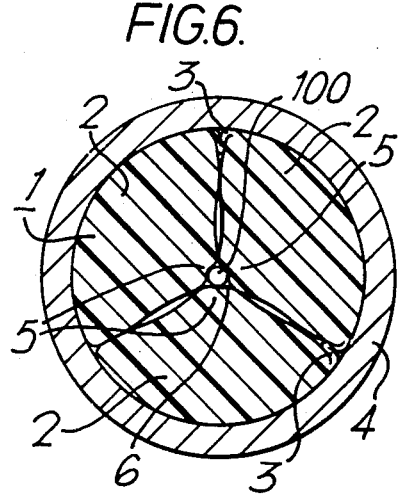
FIG. 6 is a view similar to FIG. 5 but showing the connector after crimping to form the required connection.

During crimping the spaces 7 in the support body 1 are closed up to the condition shown in FIGS. 4 and 6, this deformation of the support body 1 keeping the restrained axial deformation of the support body 1 to a minimum whereby it is ensured that the ends of the two fibres 100 are not urged against each other or moved apart by a distance giving unacceptable losses in the transmission path through the fibres.

There is thus formed a permanent butt splice between the two fibres 100, which splice can be easily produced in the field by a workman since the connector is formed of only two parts, namely the tubular member 4 and the support body 1, and the connection can be formed by means of a simple conventional hand tool to effect the crimping operation.

For most types of optical fibre it is unnecessary to strip the cladding from the fibre core over the portions to be received in the support body of the connector of this invention, the connector being crimped about clad fibre portions. However, when fibres having relatively soft cladding, for example plastics clad silicon fibres, are to be spliced, it is preferable for the cladding to be removed from the fibre cores over the portions of the fibres to be received in the support body of the connector. If this is not done then there is the possibility that during crimping the cladding of the two fibres will not be uniformly deformed, this resulting in the fibres not remaining accurately axially aligned as required. As will be appreciated, if the cladding is removed from the fibres, then the index of refraction of the support body of the connector must be equal to or lower than that of the fibre cladding in order to prevent losses at the splice. If the support body is of metal then the surfaces thereof which engage the fibre cores can be given a specular coating of, for example, gold or silver, in order to prevent any losses at the splice.

Although in the embodiment described above the fibres 100 are of the same diameter, the connector described can equally well be used with fibres of different diameters provided the smaller diameter fibre is adequately gripped by the support body after crimping. With such use, the smaller diameter fibre will not be supported at these positions when initially inserted into the passage 6 formed by the support body 1, but will be centered and supported as necessary when crimping of the connector is carried out whereby the axes of the two fibres being connected will be aligned.

What is claimed is:

1. A connector for use in butt splicing two optical fibres, comprising a tubular member of deformable material, and three elongate members receivable in the tubular member to define a central passage to receive end portions of the two optical fibres to be spliced, in which the tubular member is a right-circular cylindrical member, and the three elongate members are of similar transverse cross-section and are integrally formed in side-by-side relationship joined by two webs, the transverse cross-section of each elongate member being such that the three elongate members can be folded together by bending of the webs, to define a substantially circular overall cross-section support body receivable in the tubular member, the innermost parts of the three elongate members together defining the central passage, and such that there are radial spaces between the three elongate members throughout the length of the support body.

2. A connector as claimed in claim 1, in which the support body is of plastics material.

3. A connector as claimed in claim 1, in which the support body is of metal.

4. A connector as claimed in claim 3, in which the surfaces of the support body which contact the fibres have a specular coating.

* * * * *